United States Patent [19]
Snoeren et al.

[11] Patent Number: 5,703,352
[45] Date of Patent: Dec. 30, 1997

[54] IMAGING DEVICE WITH ANTI-CONDENSATION PROVISION

[75] Inventors: Rudolph M. Snoeren; Coenraad A.A.M. Vugts, both of Eindhoven, Netherlands

[73] Assignee: U.S. Philips Corporation, New York, N.Y.

[21] Appl. No.: 563,707

[22] Filed: Nov. 28, 1995

[30] Foreign Application Priority Data

Nov. 30, 1994 [EP] European Pat. Off. ............ 94203479

[51] Int. Cl.$^6$ ............................................. H01J 40/14
[52] U.S. Cl. ............................... 250/208.1; 250/239
[58] Field of Search ..................... 250/208.1, 208.2, 250/208.3, 239

[56] References Cited

U.S. PATENT DOCUMENTS

| | | | |
|---|---|---|---|
| 4,957,358 | 9/1990 | Terada et al. | 350/588 |
| 5,216,250 | 6/1993 | Pellegrino et al. | 250/370 |
| 5,543,612 | 8/1996 | Kanaya et al. | 250/208.1 |

FOREIGN PATENT DOCUMENTS 07038788A 2/1995 Japan.
2146865 4/1985 United Kingdom.

OTHER PUBLICATIONS

"CCD Imaging", by A.J.P. Theuwissen, Philips J. Research 48, 1994, pp. 147–158.

*Primary Examiner*—Edward P. Westin
*Assistant Examiner*—Kevin Pyo
*Attorney, Agent, or Firm*—Steven R. Biren

[57] ABSTRACT

An imaging device is provided with an image sensor element (1) for electromagnetic radiation (11) with a covering body (2) which is transparent and to the radiation (11) through which the radiation (11) can reach the sensor element (1). The imaging device is characterized in that a transparent electrically-conducting layer (3) is provided on the covering body (2) and is provided with two connection electrodes (4, 5) for heating of the covering body (2) with an electric power supplied through the electrodes (4, 5) and dissipated in the transparent layer (3). It is possible with such an imaging device to prevent condensation of a water film on the covering body (2) under conditions where the temperature of the covering body (2) lies below the dew point of the surroundings.

9 Claims, 1 Drawing Sheet

IMAGING DEVICE WITH ANTI-CONDENSATION PROVISION

BACKGROUND OF THE INVENTION

The invention relates to an imaging device provided with an image sensor element for electromagnetic radiation and a covering body which is transparent to said radiation and through which the radiation can reach the sensor element. The invention also relates to an image sensor element.

Such an imaging device, also called a camera, is particularly suitable for converting images into electric signals. Electromagnetic radiation forming an image then generates electric charge in the image sensor element, which charge is subsequently processed by an electronic circuit into electric signals which lead to a display of the image, for example, by means of a TV monitor. The image sensor element comprises a covering body, usually made of glass, which screens the image sensor element against external influences, yet transmits the electromagnetic radiation, so that the radiation can reach the image sensor element and can generate the charge there.

The article: "CCD Imaging" by A. J. P. Theuwissen, Philips Journal of Research, Vol. 48, No. 3, 1994, p. 147, discloses a device of the kind mentioned in the opening paragraph in which a charge coupled device (CCD) is used as the image sensor element in a TV camera.

Although the imaging device described usually performs satisfactorily, the known device described has the disadvantage that nevertheless no good rendering of the image is obtained under certain ambient conditions.

SUMMARY OF THE INVENTION

The invention has for its object inter alia to counteract said disadvantage.

According to the invention, the imaging device is for this purpose characterized in that a transparent, electrically conducting layer is provided on the covering body and is provided with two connection electrodes to enable heating-up of the covering body by means of an electric power supplied through the electrodes and dissipated in said transparent layer.

The invention is based on the recognition that a less satisfactory image is obtained under certain circumstances owing to condensation of a water film on the covering body. This takes place especially when a comparatively cold covering body is brought into a comparatively warm, humid atmosphere. If the temperature of the image sensor is lower than the dew point of the humid surroundings, moisture will condense on the covering body and no good rendering of the image will be possible with the imaging device. In the device according to the invention, an electric power can be dissipated in the electrically conducting layer by means of an electric power source (current or voltage source) through the two electrodes in order to heat up the covering body. No condensation will occur anymore on the covering body when the covering body is held or brought at/to a temperature above the dew point, and the imaging device will render the image satisfactorily.

The covering body may be at a certain distance from the image sensor element. Thus a system of lenses may be present in front of the image sensor element, acting as a transparent covering body. Preferably, the imaging device according to the invention is characterized in that the covering body is provided in the form of a cover plate in an envelope of the image sensor element. The term "envelope" is here understood to mean the "package" in which the image sensor element, for example a semiconductor chip, is accommodated. The image sensor element is highly sensitive to disturbances in the transparency of a cover plate which lies immediately adjacent the sensor element. An additional advantage here is that the electric supply lines of the electrodes can be combined with the electric supply wires of the image sensor element.

An additional advantage is obtained when the image sensor element is provided with a cooling device. It is possible then to operate an image sensor element at a comparatively low temperature. This offers the advantage that noise and a so-called dark current, i.e. a charge current which is generated irrespective of whether electromagnetic radiation is incident on the image sensor element or not, can be kept at a low level. When such a cooling device is used, not only the temperature of the image sensor element will be comparatively low, but the envelope of the imaging device and the cover plate will also assume a comparatively low temperature owing to heat conduction. Under such circumstances, the temperature of the cover plate may drop below the dew point of the surroundings, so that condensation of moisture can occur. In an imaging device according to the invention, the cover plate may be brought and/or held to/at such a temperature by means of the electric power dissipated in the conducting layer that no condensation occurs. The resistance change of the conducting layer as a function of the temperature of this layer may then be used in a control mechanism for keeping the temperature of the covering body constant.

Preferably, the cooling device comprises a Peltier element. It is possible then to keep the image sensor element at a comparatively low temperature by means of an electric power. The supply of electric power to the Peltier element is simpler in practice than other forms of cooling such as, for example, water cooling, while in addition a temperature control for the image sensor element is comparatively easy to realize.

In principle, known materials such as, for example, antimony-doped tin oxide or neodymium gallate may be used for the transparent conducting layer. Preferably, an indium-tin oxide layer (ITO) is provided as the transparent electrically conducting layer. Such a layer has the advantage that the absorption of radiation by the conducting layer is low (approximately 1 to 2%) for electromagnetic radiation in the visible range, so that the influence of the conducting layer on the quantity of electromagnetic radiation which reaches the image sensor element is small, while in addition the electrical resistance of ITO has a suitable value.

Preferably, an additional transparent layer with a refractive index and thickness such that the electrically conducting layer and the additional layer together form an anti-reflection coating for the covering body is provided on the transparent electrically conducting layer. Losses of electromagnetic radiation can occur through reflections at the surface of the conducting layer owing to the difference in refractive index between the layer, the material of the covering body, and air. These losses mount to approximately 17% in the case of a conducting ITO layer on a glass covering body. The provision of the additional layer, with the conducting layer and the additional layer together forming an anti-reflection coating which is known per so, renders it possible to reduce this reflection very strongly, so that more electromagnetic radiation reaches the image sensor element. Such an additional layer may comprise a plurality of layers of different refractive index.

Preferably, a heat-reflecting layer is provided on a surface of the covering body facing the image sensor element, while the transparent electrically conducting layer is provided on a surface of the covering body facing away from the image sensor element. Such an embodiment has the advantage that only a portion of the heat radiation of the covering body, which is heated up during operation of the device, reaches the image sensor element. It is prevented thereby that the imaging device is heated through heat radiation from the covering body, which would impair the performance of the imaging device.

BRIEF DESCRIPTION OF THE DRAWING

The invention will be explained in more detail below by way of example with reference to the drawing, in which.

The Figures are purely diagrammatic and not drawn to scale.

DESCRIPTION OF THE PREFERRED EMBODIMENTS

Figure 1:
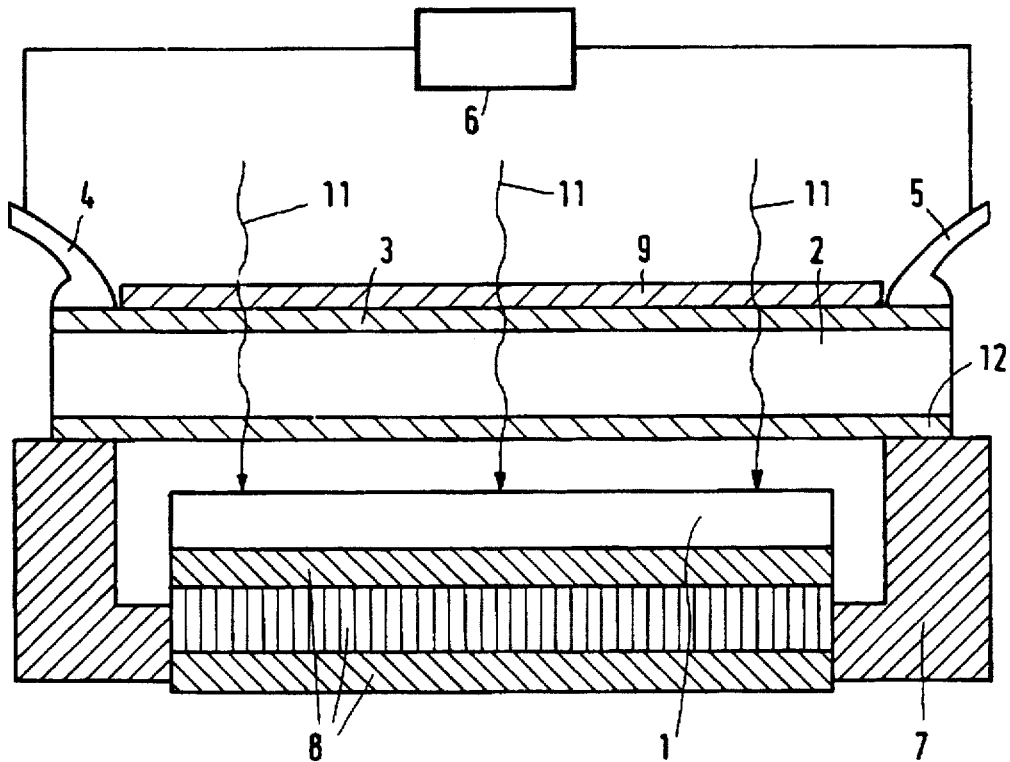
FIG. 1 shows an imaging device according to the invention.

FIG. 1 shows an imaging device provided with an image sensor element 1 for electromagnetic radiation 11 with a covering body 2 which is transparent to the radiation 11 and through which the radiation 11 can reach the sensor element 1. According to the invention, a transparent electrically conducting layer 3 is provided on the covering body 2 and has two connection electrodes 4, 5 connected to an electric source 6 for enabling heating-up of the covering body 2 by an electric power dissipated in the transparent layer 3.

In the example of FIG. 1, the covering body 2 is provided in an envelope 7 of the image sensor element 1 in the form of a cover plate. The envelope 7 is here understood to be the "package" in which the image sensor element 1, for example a semiconductor CCD chip, is accommodated in order to protect it against ambient influences. The image sensor element 1 is highly sensitive to disturbances in the transparency of the cover plate 2 which is situated immediately above the sensor element 1. An additional advantage is that the electric supply lines of the electrodes 4, 5 can be combined with the electric supply wires of the image sensor element 1 (not drawn).

The present embodiment of the image sensor element 1 is provided with a cooling device 8. It is possible then to operate an image sensor element 1 at a comparatively low temperature. This has the advantage that noise and a so-called dark current, i.e. a current of charge carriers generated irrespective of whether electromagnetic radiation 11 is incident on the image sensor element 1 or not, can be kept at a low level. When such a cooling device 8 is used, not only the temperature of the image sensor element 1 will be comparatively low, but the envelope 7 of the image sensor element and the covering body 2 may also assume a comparatively low temperature owing to heat conduction. The temperature of the covering body 2 may also drop below the dew point of the surroundings under such circumstances, so that condensation of moisture can occur. In an imaging device according to the invention, the covering body 2 may be brought and/or held to/at such a temperature by means of electric power dissipated in the conducting layer 3 that no condensation occurs. Preferably, the cooling device comprises a Peltier element 8. This renders it possible to keep the image sensor element 1 at a comparatively low temperature by means of an electric power. It is easier in practice to supply electric power to a Peltier element than, for example, to use a water cooling, while in addition a temperature control for the image sensor element 1 is comparatively easy to realise.

Figure 2:
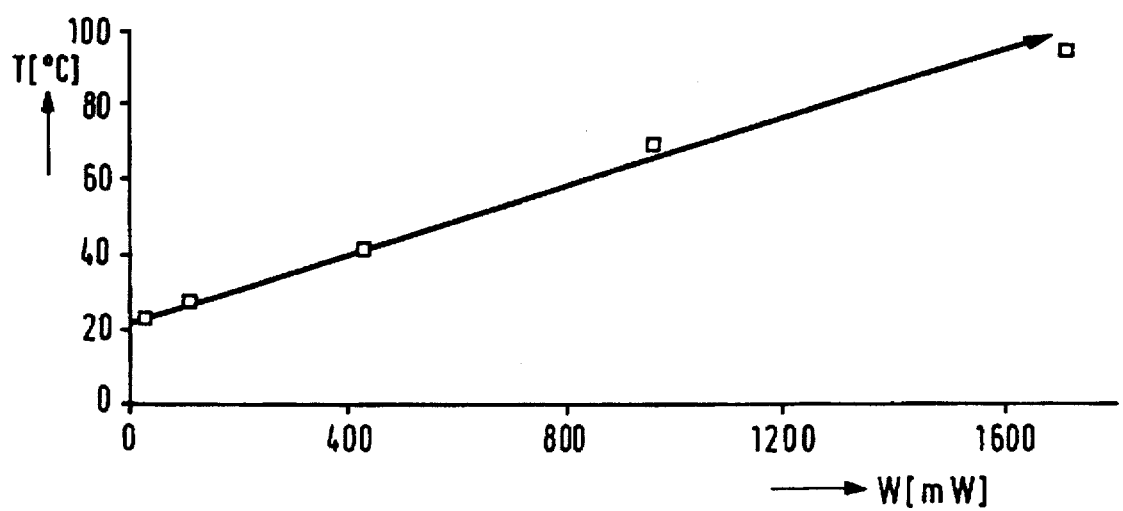
FIG. 2 is a graph representing the relation between the temperature T and the electric power W in a covering body.

In principle, known materials such as, for example, antimony-doped tin oxide or neodymium gallate may be used for the transparent conducting layer 3. Preferably, an indium-tin oxide layer 3 (ITO) is provided as the transparent electrically conducting layer 3. Such a layer 3 has the advantage that the absorption of radiation 11 by the conducting layer 3 is small (approximately 1 to 2%) for electromagnetic radiation 11 in the visible range, so that the influence of the conducting layer 3 on the quantity of electromagnetic radiation 11 reaching the image sensor element 1 is small. Such an ITO layer is provided by a vapour deposition process which is known per se, whereby indium and tin are vapour-deposited in an atmosphere of argon and oxygen. The indium/tin weight ratio may be chosen in dependence on the desired optical and electrical properties. Indium and tin are provided in a ratio of 85/15% by weight in the present case. The indium-tin oxide is given an aftertreatment for 1 hour at 300° C. A transparent conducting layer then arises with a square resistance of approximately 200 Ω and a refractive index "n" of 2.0. The electrodes 4, 5 may be provided in various ways. Thus a metal layer may be vapour-deposited on part of the ITO layer, on which supply lines are connected by soldering. In the present example, a silver paste is provided on the ITO layer, to which paste the supply wires are soldered. FIG. 2 shows a graph of the temperature T as a function of the electric power W dissipated in a glass plate of 36×36×1 mm used as the covering body. It is apparent that the temperature of the covering plate 2 can be held above the dew point in practical circumstances by means of the ITO layer.

Reflections at the surface of the conducting layer 3 caused by the difference in refractive index between layer 3, the material of the covering body 2, and the ambient air may indeed lead to losses in electromagnetic radiation 11. These losses amount to approximately 17% for a conducting ITO layer 3 on a glass covering plate. An additional transparent layer 9 with a refractive index and thickness such that the electrically conducting layer 3 and the additional layer 9 together form an anti-reflection coating for the covering body is provided on the transparent electrically conducting layer 3. The provision of the additional layer 9 renders it possible to reduce the reflection of radiation 11 very strongly, so that more electromagnetic radiation 11 reaches the image sensor element 1. The additional layer 9 may comprise several layers of different refractive index. The transparent conducting layer, 3 and the additional layer 9 then form a multilayer anti-reflection coating. The materials and layer thicknesses chosen for the transparent electrically conducting layer and the additional layer 9 follow from formulas for multilayer anti-reflection coatings such as those known from, for example: Thin Film Optical Filters, by McLeod, Publ. Adam Hilger Ltd., Bristol. For example, a layer of $SiO_2$, $ZrO_2$, $CeF_3$, $CeO_2$ may be provided as the additional layer. In the present example, a layer of $MgF_2$ (refractive index=1.40) with a thickness of 95 nm is provided on an ITO layer (refractive index=2.0) of 66 nm thickness. The reflection of incident radiation 11 then is no more than 1.4% for a wavelength of 530 nm of the electromagnetic radiation 11.

Preferably, a heat-reflecting layer 12 is provided on a surface of the covering body 2 facing the image sensor element 1, while the transparent electrically conducting layer 3 is provided on a surface of the covering body 2 facing away from the image sensor element 1. The heat-reflecting layer chosen is a layer which reflects electromagnetic radiation in the far infrared range (heat radiation). Materials for this layer may be the same materials as those for the additional transparent layer. Thus, for example, a layer of $SiO_2$, $ZrO_2$, $CeF_3$, $CeO_2$, or $MgF_2$ may be provided. An embodiment having a heat-reflecting layer 12 has the advantage that only a portion of the heat radiation from the heated covering body 2 reaches the image sensor element 1. It is prevented thereby that the image sensor element is heated up by heat radiation from the covering body 2, which would impair the performance of the imaging device. In the present example, a heat-reflecting layer of $MgF_2$ of 200 nm thickness is provided. Layer thickness is not critical for the application as a heat-reflecting layer. The heat is reflected for a major portion by such a layer.

The invention is not limited to the embodiment described above. Thus the covering body 2 in the embodiment forms part of the envelope 7 of the image sensor element 1. It will be evident that it is alternatively possible for, for example, a lens which is in contact with the ambient air to be regarded as the covering body referred to in the description. Alternative materials which are known per se may very well be used for the electrically conducting transparent layer 3, the additional layer 9, and the heat-reflecting layer 12. Such layers, furthermore, may be provided by methods other than those mentioned in the embodiment.

We claim:

1. An imaging device provided with an image sensor element for electromagnetic radiation and a covering body spaced apart therefrom which is transparent to said radiation and through which the radiation can reach the sensor element, characterized in that a transparent, electrically conducting layer is provided on the covering body and is provided with two connection electrodes for heating the covering body during operation by electric power supplied through the electrodes and dissipated in said transparent layer, a heat-reflecting layer is provided on a surface of the covering body facing the image sensor element, and the transparent electrically conducting layer is provided on a surface of the covering body facing away from the image sensor element.

2. An imaging device as claimed in claim 1, characterized in that the covering body is provided in the form of a cover plate in an envelope of the image sensor element.

3. An imaging device as claimed in claim 2, characterized in that the image sensor element is provided with a cooling device.

4. An imaging device as claimed in claim 3, characterized in that the cooling device comprises a Peltier element.

5. An imaging device as claimed in claim 1, characterized in that an indium-tin oxide layer is provided as the transparent electrically conducting layer.

6. An imaging device as claimed in claim 1, characterized in that an additional transparent layer with a refractive index and thickness such that the electrically conducting layer and the additional layer together form an anti-reflection coating for the covering body is provided on the transparent electrically conducting layer.

7. An image sensor element for electromagnetic radiation and a covering body which is transparent to said radiation and through which the radiation can reach the sensor element, characterized in that a transparent, electrically conducting layer is provided on the covering body and is provided with two connection electrodes to enable heating-up of the covering body by means of an electric power supplied through the electrodes and dissipated in said transparent layer, a heat-reflecting layer is provided on a surface of the covering body facing the image sensor element, the transparent electrically conducting layer is provided on a surface of the covering body facing away from the image sensor element and the covering body is provided in the form of a cover plate in an envelope of the image sensor element.

8. An imaging device as claimed in claim 2, characterized in that an indium-tin oxide layer is provided as the transparent electrically conducting layer.

9. An imaging device as claimed in claim 2, characterized in that an additional transparent layer with a refractive index and thickness such that the electrically conducting layer and the additional layer together form an anti-reflection coating for the covering body is provided on the transparent electrically conducting layer.

* * * * *